United States Patent
Ogram

(10) Patent No.: US 12,475,017 B1
(45) Date of Patent: Nov. 18, 2025

(54) RATING SYSTEM

(71) Applicant: Mark Ogram, Tucson, AZ (US)

(72) Inventor: Mark Ogram, Tucson, AZ (US)

( * ) Notice: Subject to any disclaimer, the term of this patent is extended or adjusted under 35 U.S.C. 154(b) by 0 days.

(21) Appl. No.: 18/831,476

(22) Filed: Feb. 6, 2025

(51) Int. Cl.
*G06F 11/34* (2006.01)
*G06F 16/334* (2025.01)

(52) U.S. Cl.
CPC ........ *G06F 11/3414* (2013.01); *G06F 16/334* (2019.01)

(58) Field of Classification Search
CPC .......................... G06F 11/3414; G06F 16/334
USPC ........................................................ 702/182
See application file for complete search history.

(56) References Cited

U.S. PATENT DOCUMENTS

| | | | |
|---|---|---|---|
| 2021/0294516 A1* | 9/2021 | Fetik | G06F 3/0653 |
| 2025/0023875 A1* | 1/2025 | Charlson | H04L 63/101 |

OTHER PUBLICATIONS

Jayachandiran et al. , Deep Learning Enabled Graph Database for Complex Queries, 2004 IEEE (Year: 2024).*
Kalafut et al. , CN 113366580A, "Use Of Distributed Learning Platform To Facilitate Integration Of Artificial Intelligence Into A System", date published: Sep. 7, 2021 (Year: 2021).*

* cited by examiner

*Primary Examiner* — John H Le
(74) *Attorney, Agent, or Firm* — Mark Ogram

(57) ABSTRACT

The invention is an evaluation system for artificial intelligence (AI) software. The AI software receives a query, generates a response, and communicate the response back to the querying computer. Using a database of stock queries and accuracy responses, an evaluating computer presents these stock queries to the AI software and compares the AI response to the accuracy responses in determining how accurate/biased the AI software is.

3 Claims, 5 Drawing Sheets

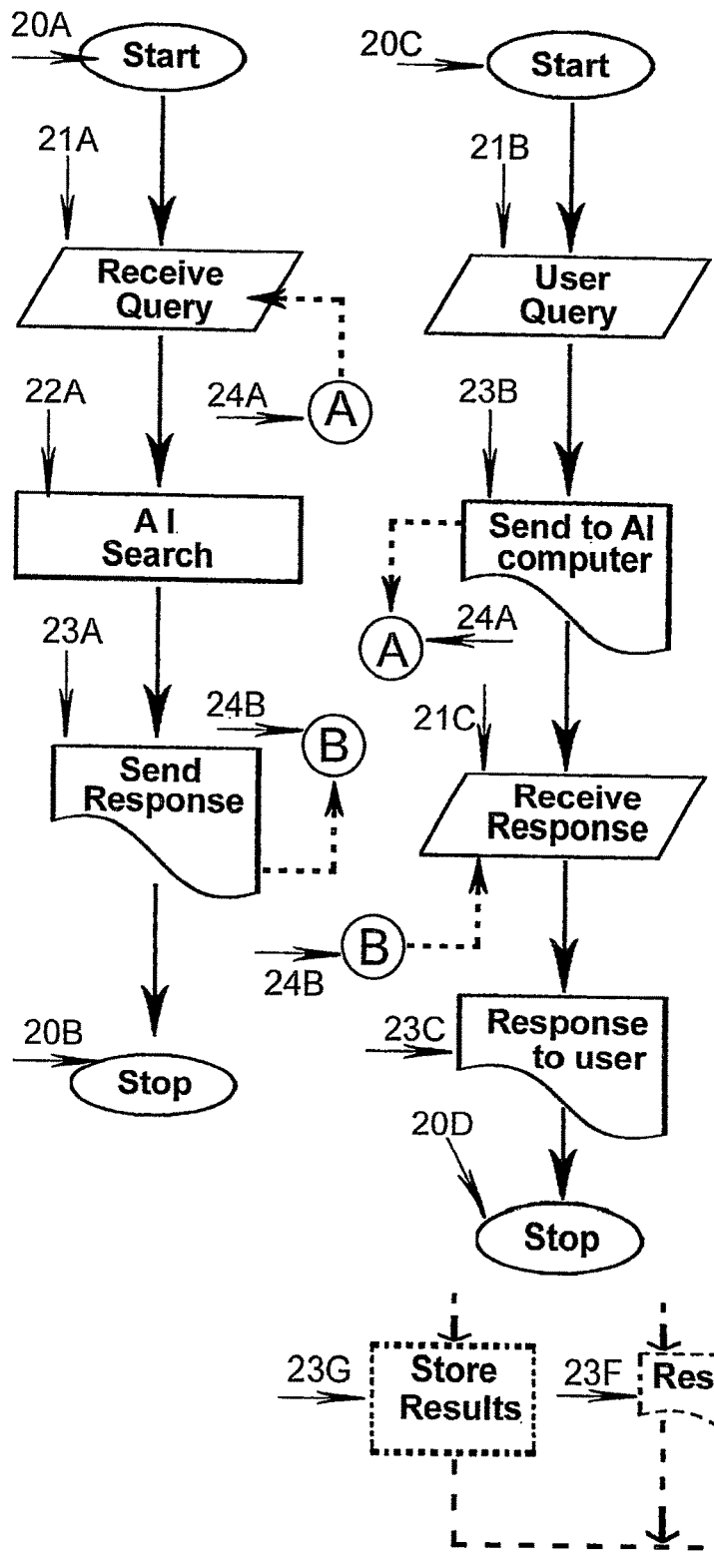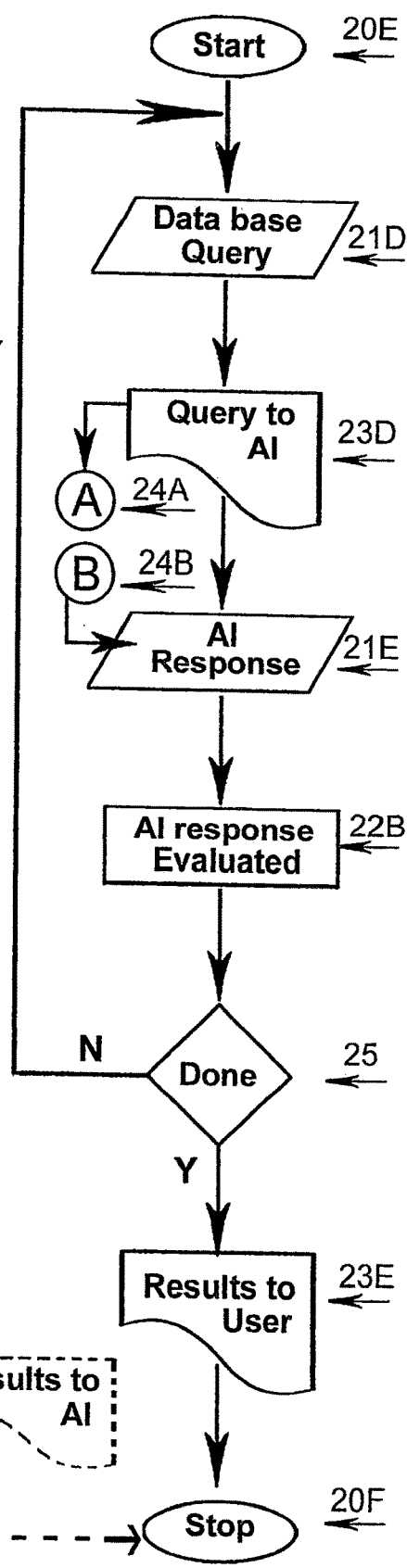

RATING SYSTEM

BACKGROUND OF THE INVENTION

This invention relates to systems for evaluating the effectiveness of artificial intelligence software.

In a very broad sense, Artificial Intelligence (AI) is an intelligence exhibited, particularly for computer systems. The objective is to enable computers, via their software, to perceive their environment and to learn from that environment.

Unlike traditional search engines, AI software is able to synthesize various data sites into one coherent body. AI is often encountered in web search engines, recommendation systems, virtual assistants, autonomous vehicles, generative/creative tools and advanced reasoning for games.

A key to AI is that the AI program must be "taught" and that is where the "Achilles Heel" is encountered. As with humans, the environment and substance of the "teaching" defines what the intelligence is. Often, the source of the AI training is through existing data bases which already have been corrupted with dated and false data/information.

The user of the AI is totally unaware of these limitations and just assumes that all AI programs are equal. This isn't the case.

It is clear there is a need for evaluating artificial intelligence systems.

SUMMARY OF THE INVENTION

The invention is an evaluation system for artificial intelligence (AI) software. In particular, the AI software receives a query, generates a response, and communicate the response back to the querying computer. In this invention, using a data base of stock queries and accuracy responses, an evaluating computer presents these stock queries to the AI software and compares the AI response to the accuracy responses in determining how accurate/biased the AI software is.

Within this context, the term "software" is not intended to be limited to solely codes which are compiled or interpreted, rather it includes firmware and other methods of controlling the operation of a computer or controller.

As used herein, the term "computer" is not limited to the traditional definition of computer having memory, but also includes a variety of devices obvious to those of ordinary skill in the art, including, but not limited to: main frame computers, desktop computers, laptop computers, cellular telephones, game consoles, kindles, and other electronic devices and apparatus The phrase an "artificial intelligence computer", "AI computer" or the like, is not to be limited to a situation wherein the artificial software is resident on that particular computer, rather, it includes where the artificial intelligence software is accessible by that computer.

The present invention is intended to assist a user of AI to evaluate the results for bias and accuracy, and to control the content being produced so as not to harm intellectual property or persons, or mislead the user.

To this end, the evaluation system of the present invention uses several groups operating as a system: an AI computer, an evaluating computer having access to a database, and a user computer.

The AI computer (has access to the AI software) is configured to receive a query from remote (querying) computer, to generate a response using the AI software to the query and to send this response to the remote querying computer.

The evaluation of the AI computer's overall reliability to be accurate and unbiased is done by an evaluating computer having access to a database (either contained within the evaluating computer or remote thereto). Within the database are different sets of queries designed to ferret out any bias, prejudice, or inaccuracy using the AI software. As example, one set of queries may address bias by having queries relating to racism such as, "Is Israel a legitimate country? or "Prepare a speech from an African-American". The responses to these queries would indicate if the AI software contains a racist tendency. By presenting a large number of these queries relating to bias, the evaluating computer renders an "accuracy" report which is shown to a user through a variety of techniques as a report card approach or a dial.

In some embodiments, the queries have an associated proper response. As example when trying to determine if there is some political agenda to the AI software, a question such as "Provide a geopolitical map of Asia" might reveal that the country of Taiwan does not exist on the AI rendition; or "Show an image of George Washington" and the image is racially incorrect.

When a user, via their computer, poses a question to the AI computer, the user, via their computer receives this accuracy report/data allowing them to judge if they want to use or rely upon that AI computer or if another AI computer should be used. In the case where the accuracy report/data is communicated to the AI compute, the programmer/operator of the AI computer is able to identifies faults/shortcomings of the AI software and make adjustments in the teaching of the AI software.

Ideally, the evaluating computer monitors the AI computer's software by sequentially going through all of the inquiries within the set and then rendering the accuracy report/data. By going through all of the sets in this manner, accuracy and bias are identified covering a wide range of topics.

In some embodiments, the user making the inquiry is concerned about a specific bias within the AI software. In this situation the user communicates with the evaluating software and identifies the user's specific concern, such as "Is this AI software pro violence?". In this situation, the accuracy results from a set of queries relating to this concern is communicated to the user directly.

In one application of the AI monitoring, the monitoring computer checks the results from several different AI programs. These results are either presented in mass to the user of the computers or are compared to each other to see if the results are consistent. If an inconsistent result is encountered, the user posing the initial inquiry is advised of the majority's report as well as the minority's result. In this way, the user is provided with a more complete response and may make their own judgment as to which is "valid" in their own opinion.

As used herein, the term "proprietary data" includes traditional copyright content, trademarks, facial and body images, spoken voice, singing voice, graphical image.

This embodiment is a system allowing the registration of proprietary data to assist inn monitoring the improper use of the data by AI programs. Using a database of registered propriety rights (copyrights, trademarks, facial images, voice reproductions, etc.) an owner of the rights is able to register these rights to prevent their unauthorized use.

In yet another application of this invention, is the control of the AI software relative to proprietary data/material which is often used for creating unwanted images and voices of individuals. This is intended to prevent the unauthorized making of entire movies having famous actors that are recreated entirely or substantially from AI generated images and speech. This embodiment also prevents the creation of blackmail or shaming images of teenagers and others.

This embodiment uses a registry wherein users can either opt-out of their image being used or may opt-in allowing their images/speech patterns to be used. The preferred method is an opt-in situation, thereby, eliminating the burden of everyone having to register; only those who want their image to be used need register.

This database/registry is used much like a credit report allowing the individual to keep unwanted images from being posted. Once an individual places their name, image, speech, or trademark onto the database/registry, the restriction on its use may be "lifted" either for a period of time or, with the use of a "key" or "password", lifted for a particular AI program. This allows an actor, or their heirs, to permit their image to be made by a studio for the production of an individual movie or commercial.

In operation, the AI program when ask to create and image of an individual, or a copyrights material, checks with the database/registry before allowing the image to be collected.

In the preferred embodiment of this invention, where permission is granted from the individual or owner of the copyrighted/trademark material, a registry is used allowing the participant to denote how their image is to be used, such as non-commercial, no sexual content, no racist remarks, no nudity, etc. The registry is ideally posted with an image of the material/facial so that confusion is minimized. If the user employs this registry properly, then an authorization "stamp" is permitted to identify the AI generated image as authentic.

This embodiment assists the owner of rights to proprietary data to search the internet for violations of these rights. Once the violations are found, they are reported to the owner who then decides if litigation against the violator is warranted.

Traditional software search engines were essentially keyword based. They sought out internet content that had the keywords contained within them and then reiterated that material or led the user to the site found using the keywords. AI software on the other hand uses information/data from variety of related and unrelated sites and forms new material completely.

As example, using AI software, the user may request, "Prepare a letter of resignation for me?". The AI software identifies multiple examples and then creates a resignation letter specifically for the user.

Whereas traditional search engines had liability protection under the statutes because they were merely repeating what someone else had created (who is usually "judgment proof"), AI software is considered the creator of the material and therefore the owner of the AI software would not be protected from liability.

An embodiment of this invention uses AI software to search out and find any violation of the proprietary data, reports all of these to the user/requester who then can determine if proper legal channels can be taken against the creator of the improper proprietary data.

The invention together with various aspects thereof will be more fully illustrated by the accompanying drawings and the following description thereof.

DRAWINGS IN BRIEF

FIG. 1 is a preferred block diagram of the preferred embodiment of the invention.

FIGS. 2A, 2B, and 2C are preferred flowcharts of the operations for the computers within the preferred embodiment of FIG. 1.

DRAWINGS IN DETAIL

Figure 1:
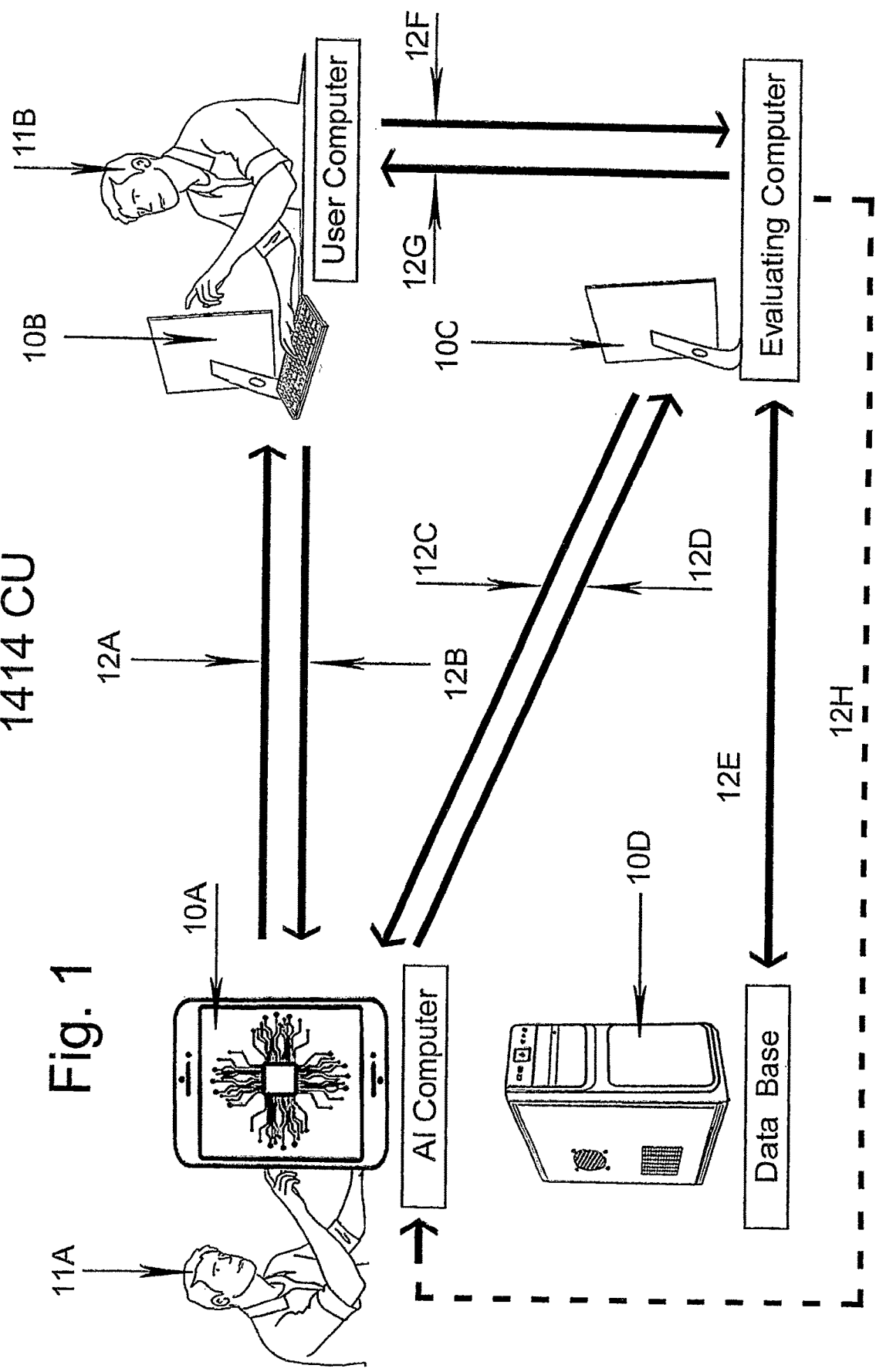

FIG. 1 is a preferred block diagram of the preferred embodiment of the invention.

In this embodiment, there are four main components: AI computer 10A, User computer 10B, evaluating computer 10C, and external database 10D. In some embodiments, external database 10D is contained within evaluating computer 10C. As noted earlier, AI computer 10A has artificial intelligence software operating thereon.

User 11B, via user computer 10B, initiates query 12A and AI computer produces response 12B. At the same time that query 12A is communicated to AI computer 10A, the same query 12F is communicated to evaluating computer 10C.

Evaluating computer 10C, based upon query 12F, determines which set of data inquires is best suited to judge the accuracy/bias of AI computer 10A. Evaluating computer 10C withdraws 12E the queries with associated accuracy data from the database 10D. This query is communicated 12C to the AI computer 10A and response 12D is received by the evaluating computer 10C. Using the response 12D, and the accuracy data obtained from database 10D, evaluating computer 10C judges how accurate/biased the AI software operating on AI computer 10A is and communicates this evaluation 12G to the User Computer 10B allowing user 11B to determine how much credence (accept/reject) should be given to response 12B.

In the preferred operation of this system, each of the sets of queries/accuracy data within database 10D relate to a specific concern. As example, one set of queries/accuracy data may be related to racially related such as the use of racist terms, another set may relate to politically neutral responses.

In one embodiment of this invention, the evaluation from evaluating computer 10C is also communicated to user 11A of the AI computer 10A. This allows the AI computer operator 11A to be aware of their effectiveness and to take appropriate steps to correct faults in their AI software teaching. In some applications, the AI computer 10A uses the evaluating computer to perform all of the sets of queries/accuracy data to give user 11A a rating as to their overall quality control and to serve as a "stamp of approval" for user 11B.

FIGS. 2A, 2B, and 2C are preferred flowcharts of the operations for the computers within the preferred embodiment of FIG. 1.

FIG. 2A is a flowchart of the referred operation of the AI computer (10A in FIG. 1). Note, the AI software has already been loaded into the computer. Once the program starts 20A, a query is received 21A from the remote user computer ("A" 24A). This query is used to perform the AI search 22A and the response generated therefrom is sent 23A to the remote computer ("B" 24B). The program then stops 20B.

FIG. 2B is a flowchart of the referred operation of the AI computer (10B in FIG. 1). The program within the user computer starts 20C and the user 11B inputs a query 21B. The query is sent to the AI computer 23B ("A" 24A), and the response is received 21C ("B" 24B) which is communicated 23C to the user (11B of FIG. 1). The program then stops 20D.

FIG. 2C is a flowchart of the referred operation of the evaluating computer (10C in FIG. 1). The program starts 20E, based on the original query, a query and accuracy data 21D is obtained from the database (10D of FIG. 1). The query is communicated to the AI computer 23D ("A" 24A) and a response 21E is received from the AI computer ("B" 24B). Using the accuracy data, the response is evaluated. If the entire set of queries and accuracy data is to be considered, the program loops back 25 to obtain another query and accuracy data from the database 21D.

If all of the queries have been completed, the results of the evaluation are communicated to the user 23E and the program stops 20F.

In some embodiments, the results of the evaluation are communicated to the AI computer 23F for the user of the AI computer to evaluate.

In some embodiments, the results of the evaluation are placed in storage 23G for use with subsequent users' queries.

In this manner the evaluating computer is able to judge the accuracy, bias and other factors of the AI software.

Figure 3:
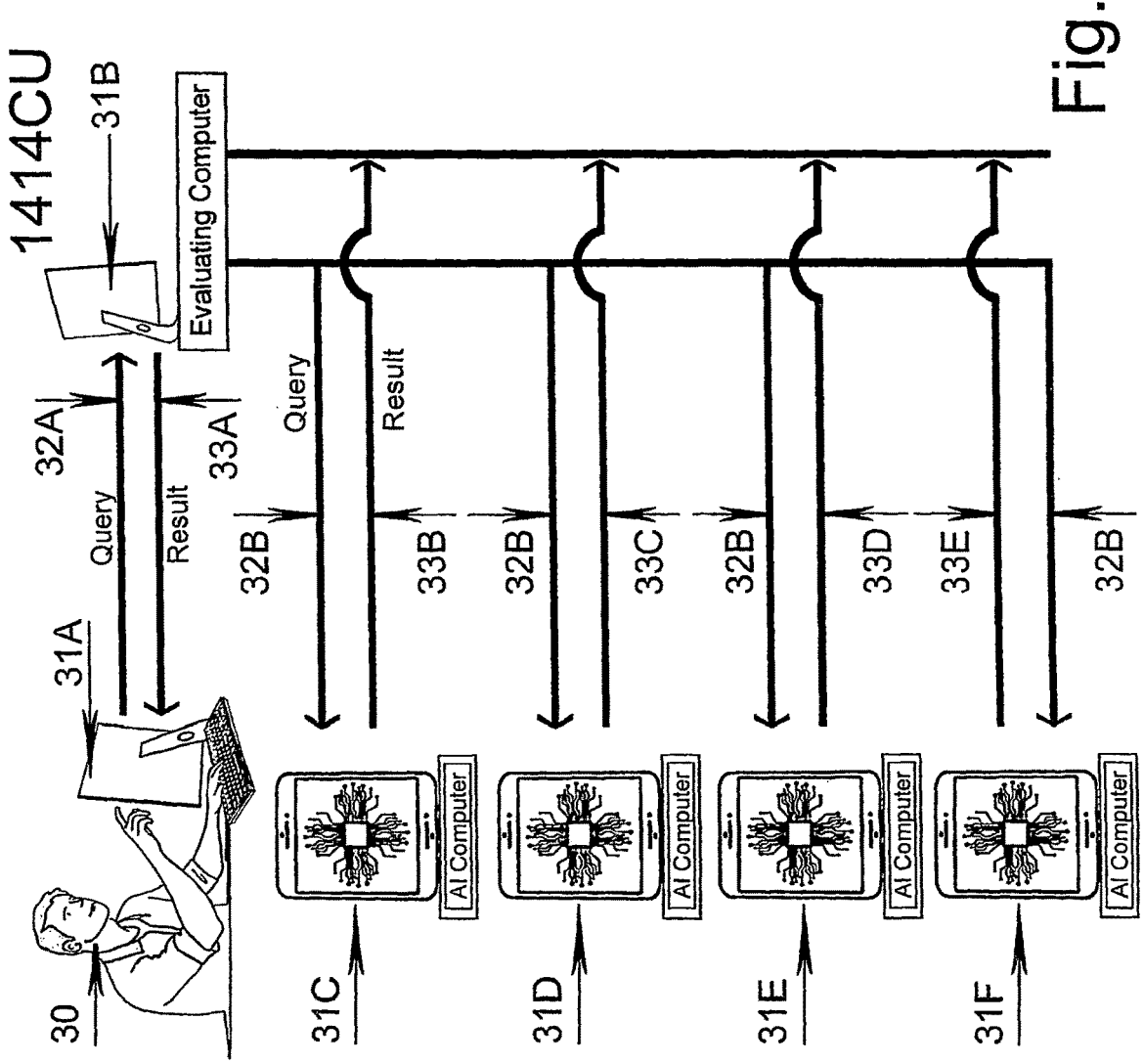
FIG. 3 is a preferred block diagram of the embodiment wherein various AI software results are compared.

FIG. 3 is a preferred block diagram of the embodiment where various AI software results are compared to achieve a ranking.

Ideally, this embodiment is used when a user presents query; in some embodiments, the use of a database, similar to that outlined above, is used to present pre-selected queries in the evaluating of the different AI software packages.

As shown here, user 30 inputs a query into the user's computer 31A. The query is communicated 32A to the evaluating computer 31B. This query is communicated 32B to a number of AI computers 31C, 31D, 31E, . . . 31F, each of which generates their own response 33B, 33C, 33D, . . . 33E which are communicated to the evaluating computer 31B. The various responses (33B, 33C, 33D, . . . 33E) from the AI computers are compared to each other and the evaluating computer 31B identifies the majority "opinion"/response which is presented 33A to the user's computer 31A and user 30. In some embodiments, minority report is also given to the user.

In this manner, the various AI software packages are used to evaluate their own accuracy.

Figure 4:
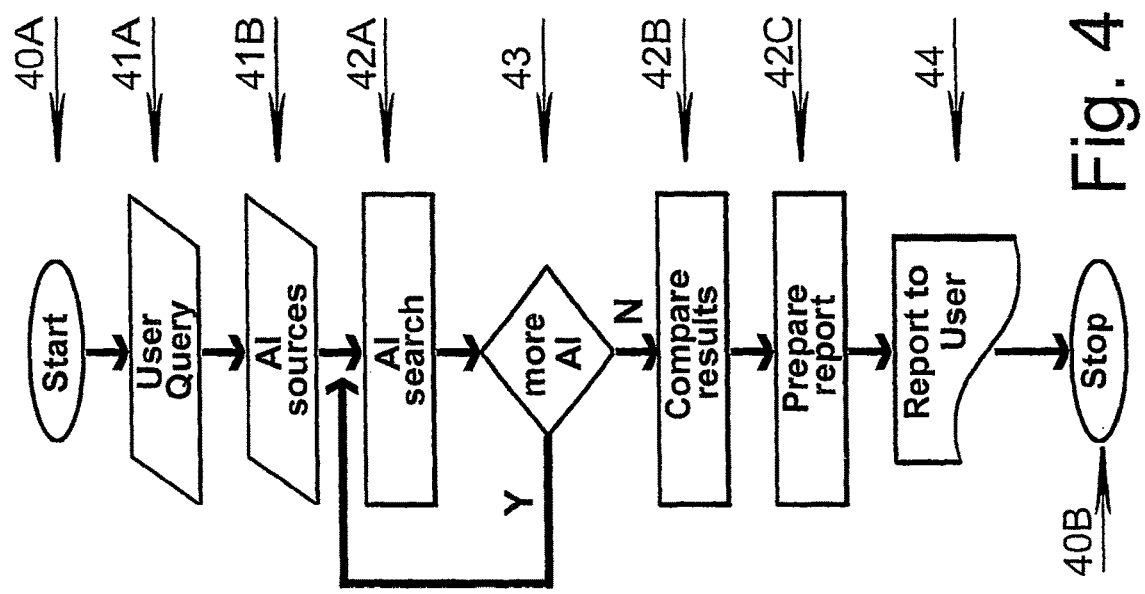
FIG. 4 is flowchart for the operation of the analysis computer of FIG. 3.

FIG. 4 is flowchart for the operation of the analysis computer 31B of FIG. 3.

The program starts 40A and receives the user generated query 41A. Using the identities of AI software 41B, the AI search 41A is performed to generate a result from all or specified ones of the AI computers. If more AI software packages are to be used 43, the program loops back to identify the next AI computer; otherwise, the results from all of the AI computers are compared 42B and a report is prepared 42C. This report is communicated to the user's computer 44 (and by extension the user) and the program stops 40B.

By using multiple AI software packages, this program is able to identify the AI software which has been "taught" poorly of insufficiently.

Figure 5:
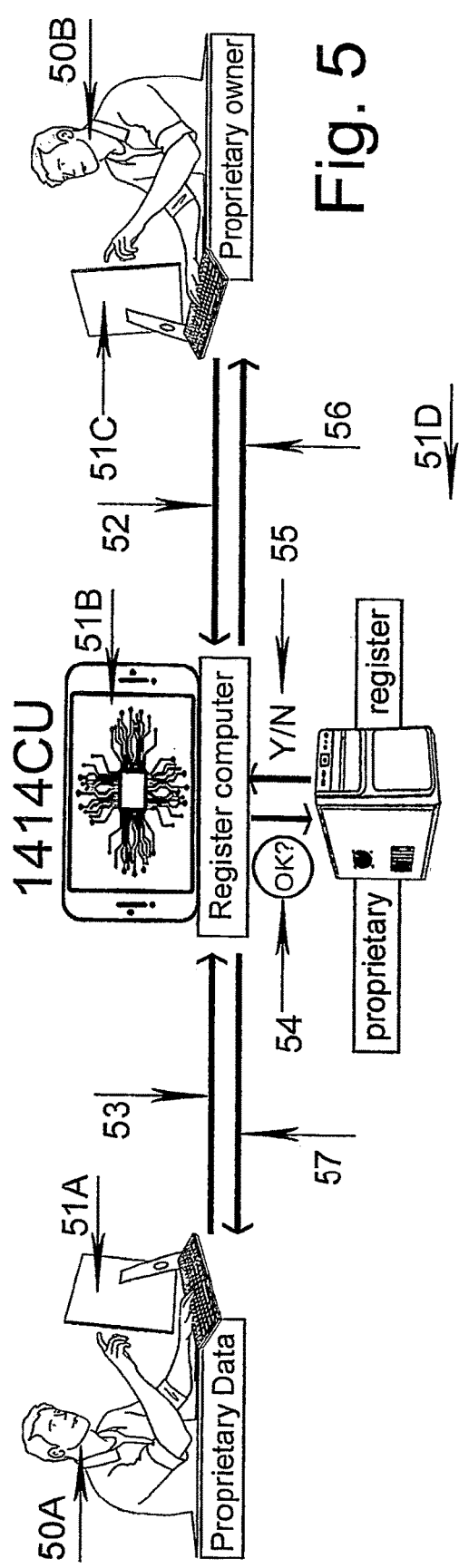
FIG. 5 is a preferred block diagram of the embodiment used to protect proprietary data.

FIG. 5 is a preferred block diagram of the embodiment used to protect proprietary data. All too often, the rights of the owner of proprietary data are violated. This includes: faces, physical bodies, voices, songs, trademarks, copyrights, and a host of other proprietary materials.

Within this embodiment, the proprietary owner 50B, via computer 51C, obtains from a registry computer 51B, a series of questions 56. These questions relate to the proprietary right itself as well as the extent of protection sought, duration of protection, and other such pertinent information. User 50B, via computer 51C, provides the registry computer 51B instructions 52 which are stored within proprietary registry 51D.

Ideally, User 50B gives positive assent to use these proprietary rights although in some embodiments, a negative assent is indicated. In the case of a negative assent (others cannot use the proprietary rights) limitations. As example, the owner may designate that their face may be use on their body.

A potential user 50A of the proprietary data, via their computer 51A, poses a query 53 to the registry computer 51B which checks with the proprietary registry 51 to see if the authorization is accepted/ok 54. The proprietary registry 51 responds with an authorization (Yes/No) 55 to the registry computer 51B which communicates this response 57 to the AI user's computer 51A.

In this manner, a potential user, is able to check to see if these rights are available to use to avoid legal/ethical entanglement later. The potential user uses this authorization to create a rendition of the property right.

Figure 6:
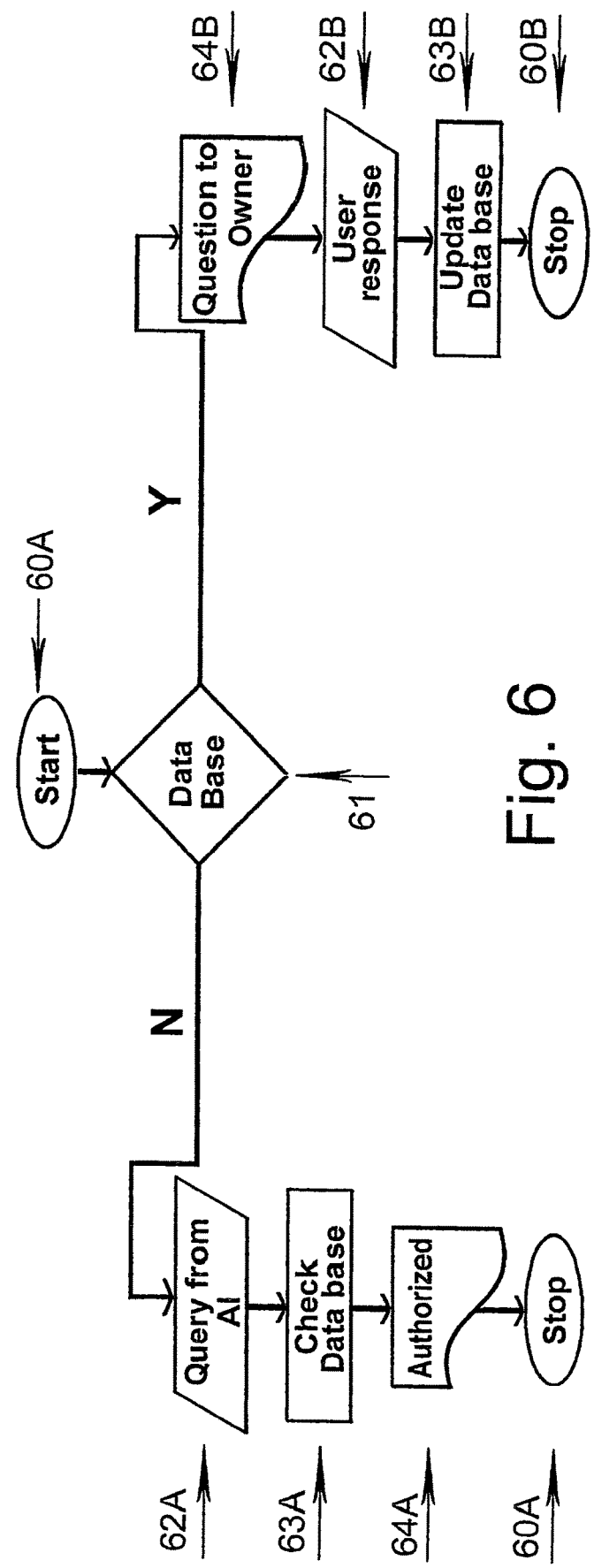
FIG. 6 is a preferred flow chart for the computer operation for the protection of proprietary data.

FIG. 6 is a preferred flow chart for the computer operation for the protection of proprietary data. This flow chart relates to the operation of the registry computer 51B of FIG. 5.

After start 60A, a determination is made 61 on if there is to be an establishment within the database or if authorization is sought.

If the owner of the proprietary data (51C of FIG. 5) desires to record their rights within the registry (51D of FIG. 5), questions 64B are present to the owner of the proprietary material (51B and 50B of FIG. 5). As noted earlier, these questions relate to the proprietary material as well as to how it is to be handled/restricted. In some situations, the user is also given a password/PIN which is used to release the restrictions either permanently or temporarily.

The program receives the user response 62B and the registry database is updated 63B. The program then stops 60B.

If authorization is sought 61, a query 62A is received from the remote AI computer relative what proprietary information is being sought. The program checks the registry database 63A on if that proprietary information may be used and this authorized/unauthorized response 64A is provided to the AI computer (51 of FIG. 5). The program then stops 60B.

Figure 7:
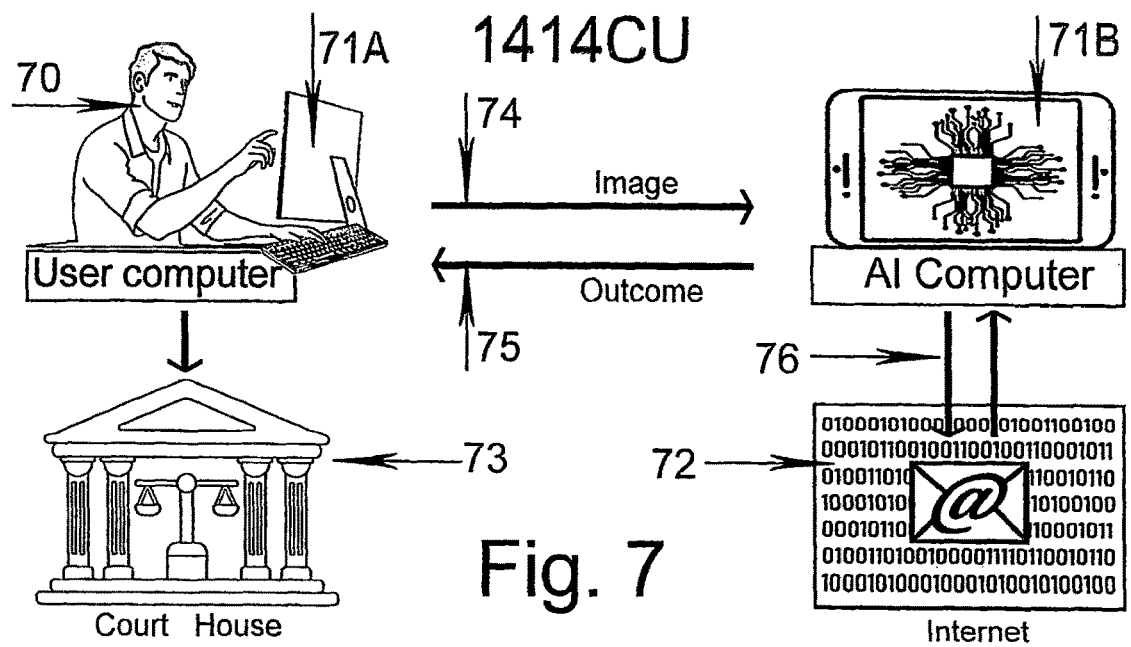
FIG. 7 is a preferred block diagram for the litigation embodiment for the protection of proprietary data.

FIG. 7 is a preferred block diagram for the litigation embodiment for the protection of proprietary data. As noted with the discussion relative to FIGS. 5 and 6 and elsewhere in this material, the use of AI has been abused through the use of images and other proprietary material for personal revenge or commercial purposes. For this reason, it is important that owners of proprietary materials have the tools to find these abuses.

User 70 communicates via computer 71A an image that they want to protect. Examples of this image may be a face, a trademark, a copyrighted material, etc. This image 71A is received by AI computer 71B which polls 76 the internet 72 to see if this image has occurred. The outcome of this search 75 is communicated from AI computer 71B to the user's computer 71A. With this information, the user is then able to determine if they want to bring litigation at the court house 73.

Figure 8:
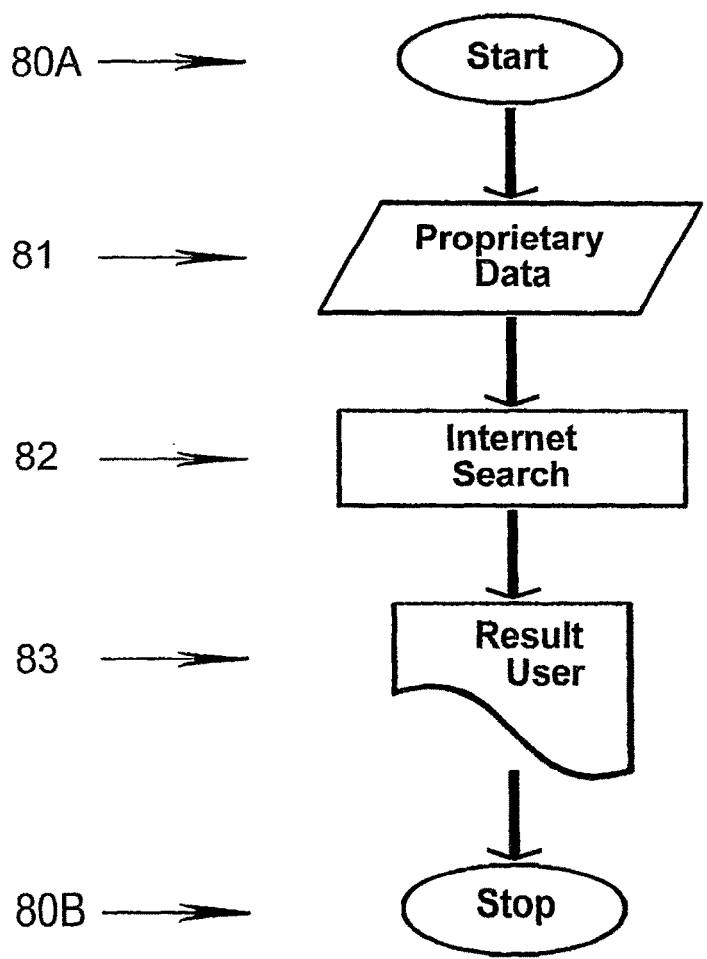
FIG. 8 is a preferred flowchart for the operation of the computer illustrated in FIG. 6.

FIG. 8 is a preferred flowchart for the operation of the computer illustrated in FIG. 7 (element 71B).

The program starts 80A and receives the image/proprietary data 81. Using this image/proprietary data, a search is made of the internet 82 generating a result identifying any violations of the rights. The violations are reported of the user's computer (71A of FIG. 7) and the program stops 80B.

While this illustration shows the owner of the proprietary data as instigating the search, other embodiments provide for a service in which the AI computer "sweeps" the internet periodically and only reports to the owner of the proprietary material when a violation occurs. This might be done where the owner wants to keep their cartoon characters from being exploited in manner not in keeping with the reputation of the cartoon character.

It is clear that the present invention provides an efficient system for evaluating artificial intelligence software.

What is claimed is:

1. A system of computers comprising:
   a) a first computer configured to operate artificial intelligence software therein;
   b) a second computer having a database of identities of computers having artificial intelligence software and associated accuracy data, said second computer communicating the associated accuracy data and inquiring query to a querying computer;
   c) the querying computer, presenting the inquiring query to the artificial intelligence software of the first computer and receiving an AI response thereto; and,
   d) whereas the second computer
      1) Withdraws a chosen query and associated accuracy data from a database,
      2) Presents the chosen query to the artificial intelligence software of the first computer,
      3) Receives a response to the chosen query from the artificial software of the first computer
      4) With the response from the artificial intelligence software of the first computer, compares the response with the associated accuracy data;
      5) Creates the accuracy evaluation for the artificial intelligence of the first computer; and,
      6) Communicates the accuracy data of the artificial intelligence software of the first computer to the second computer.

2. The system of computers according to claim 1, wherein the chosen query used by the querying computer is established by a user of a remote computer and communicated to the querying computer from the second computer.

3. The system of computers according to claim 1, wherein,
   a) The inquiring query is communicated by the querying computer to the first computer; and,
   b) the accuracy evaluation is determined in response to the inquiring query.

* * * * *